United States Patent

[11] 3,533,491

[72] Inventor Robert R. Svenson
Ashtabula, Ohio
[21] Appl. No. 714,650
[22] Filed March 20, 1968
[45] Patented Oct. 13, 1970
[73] Assignee By mesne assignment to Rockwell-Standard Company, Pittsburgh, Pennsylvania
a corporation of Delaware

[54] BRAKE WITH LINING WEAR INDICATOR
6 Claims, 5 Drawing Figs.
[52] U.S. Cl. .................................................. 188/1, 116/114
[51] Int. Cl. ...................................................... F16d 66/02
[50] Field of Search ........................................ 116/114,16; 188/1(A)

[56] References Cited
UNITED STATES PATENTS
3,055,456   9/1962   Pfeiffer ........................ 188/1(A)UX Primary Examiner—Duane A. Reger
Attorney—John R. Bronaugh ABSTRACT: A brake shoe lining wear indicator having a manually actuatable brake shoe position indicator which can be moved to engage the brake shoe in a position to indicate the degree of wear of the lining of said shoe and which indicator has indicia thereon at the exterior of the brake mechanism which may be sensed to determine the degree of brake shoe lining wear.

Patented Oct. 13, 1970

3,533,491

Sheet 1 of 2

BRAKE WITH LINING WEAR INDICATOR

BACKGROUND OF INVENTION

In the servicing of automotive vehicles, it is necessary to periodically inspect the shoes of each brake assembly to determine the degree of wear of the linings of the shoes. Failure to do so will result in scoring of the brake drums, requiring regrinding of the brake drum, if the lining support and mounting elements become exposed by excess lining wear. This is particularly true in brake assemblies in which the linings are secured to their platforms by bolts or rivets. In common practice in the prior art this operation of determining the degree of wear of the brake shoe linings has required removal of the brake drum and the associated wheel, a time consuming and expensive operation.

U.S. Pat. No. 3,138,224, issued June 23, 1964 to A. J. White for "Brake Having Means to Indicate Wear" is illustrative of the prior art efforts to solve this problem. Such efforts have provided apertures in the brake shoe backing plate and markings on the linings which may be viewed through the aperture in the backing plate to provide a visual indication of the degree of wear of the brake shoe lining. So far as I am aware such prior art solutions have not been adopted to any significant extent, if at all, by the brake industry.

The reason for the lack of acceptance of these prior art efforts is quite apparent when one considers the problem involved. The indication of lining wear is only apparent when one looks through a small aperture into the interior of a dark, substantially completely enclosed chamber, defined by the backing plate in the interior of the brake drum. It is extremely difficult to get one's head in a position where one can look through the tiny aperture and even more difficult to get light into the interior of the chamber at the same time so that one can view the indicia or marking on the brake shoe lining. In addition, providing marking on the brake shoe lining increases the cost of the lining itself, an element of the brake shoe which is inherently a disposable element and one which should be fabricated at absolute minimum cost compatible with its functional effectiveness.

With the foregoing considerations in view, it is the primary object of the present invention to provide an improved brake shoe lining wear indicator equipped brake in which the degree of lining wear can be determined without visual access to the interior of the chamber defined by the brake drum and which preferably can be operated to provide an indication exteriorally of the brake assembly of the degree of the brake shoe lining wear which indication can be sensed by service personnel either visually or by the sense of touch.

More specifically, it is the object of the present invention to provide an improved brake shoe lining wear indicator equipped brake actuatable brake shoe position indicator which can be moved to engage the brake shoe in a position indicative of the degree of wear of the lining of said shoe and which indicator has indicia thereon at the exterior of the brake mechanism which may be sensed to determine the degree of brake shoe lining wear.

These and other objects of the present invention will become more fully apparent by reference to the appended claims and as the following detailed description proceeds with reference to the accompanying drawings.

DETAILED DESCRIPTION - FIRST EMBODIMENT

Figure 1:
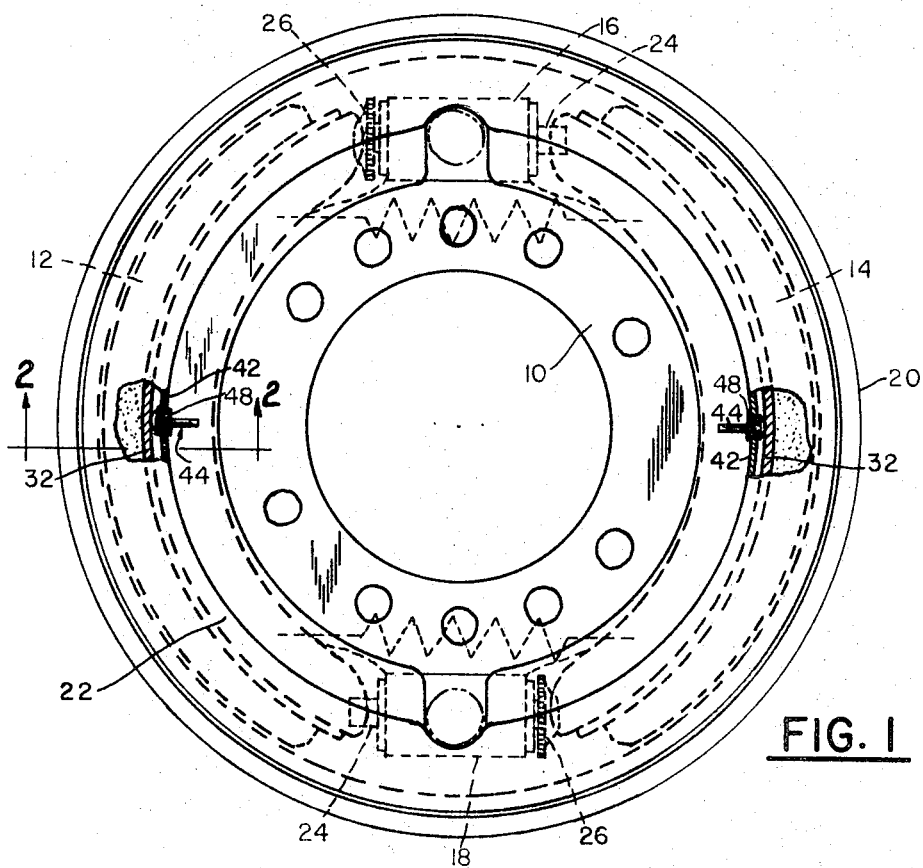
FIG. 1 is a plan view from the inboard side of a deenergized brake embodying the features of the present invention.

Referring now in detail to the drawings and particularly to FIG. 1, there is there illustrated a brake mechanism of the general type illustrated in U.S. Pat. No. 3,037,584 issued June 5, 1962 to F. T. Cox, Jr., et al., for Wedge Actuated Brake Assembly, and one preferably equipped with the automatic adjustment feature of the type illustrated in U.S. Pat. No. 3,068,964, issued Dec. 18, 1962 for Automatic Brake Adjustment, to W. J. Williams, et al.

As is illustrated in FIG. 1, such a mechanism comprises a brake spider which may be bolted or otherwise fixed to the brake spider mounting flange on the outer end of an axle (not shown), a pair of opposed arcuate brake shoes 12 and 14 mounted on the spider 10, and having disposed between their opposed ends a pair of actuators 16 and 18, the brake shoes being surrounded by and disposed within a brake drum 20. A dust shield 22, best shown in FIG. 2, is fixed at its center to the spider 10 and extends radially outwardly and axially away from the spider 10 as illustrated in FIG. 2 to substantially close the open end 24 of the brake drum 20 to inhibit entrance of dirt and dust into the interior of the brake drum 20 and into contact with the brake shoes 12 and 14 of the brake actuating mechanisms 16 and 18.

In brakes of this type, each of the actuators 16 and 18 has a fixed length plunger 24 and a variable length plunger 26. The variable length plunger 26 is adjusted to maintain the stroke of the plungers 24 and 26 constant despite wear of the brake shoe lining. As a result, with brake shoe lining wear, the shoes 12 and 14 gradually shift slightly in a counterclockwise direction about the axis of the brake.

Figure 2:
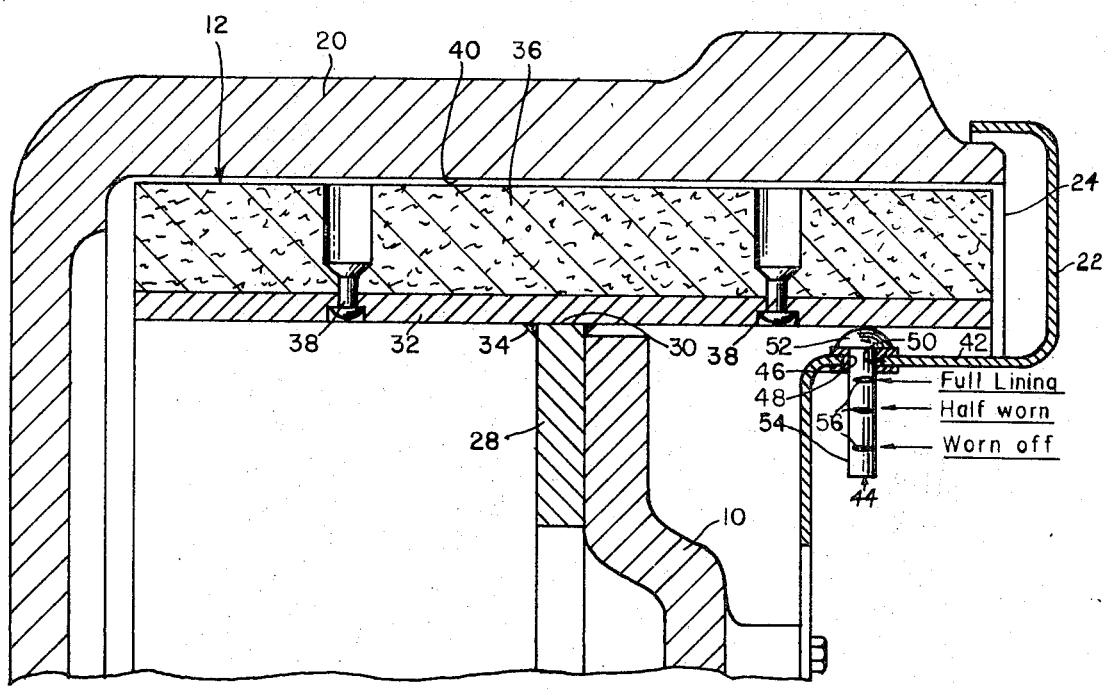
FIG. 2 is a fragmentary sectional view taken substantially along the line 2–2 of FIG. 1 illustrating the position of the lining wear indicator with the brake deenergized and the configuration of the lining before there has been any significant degree of wear of the lining.
Figure 3:
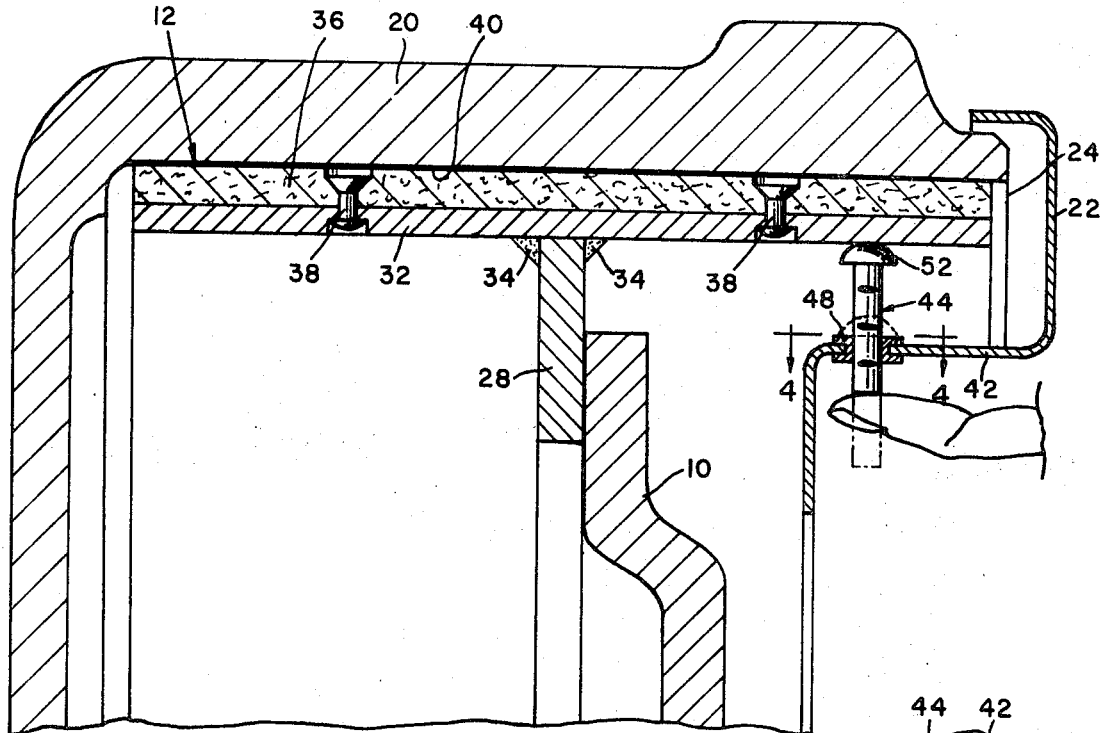
FIG. 3 is a view similar to FIG. 2 illustrating the manipulation of the lining wear indicator and the position of the brake shoe while the brake is energized and after there has been an appreciable degree of wear of the lining of the brake shoe.
Figure 4:
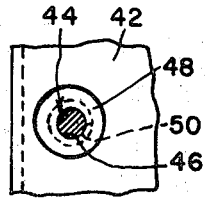
FIG. 4 is a fragmentary sectional view taken substantially along the line 4–4 of FIG. 3.

As is apparent from FIG. 2, each of the brake shoes comprises, conventionally, a radially extending central web 28 having on its arcuate peripheral edge 30 an arcuate rigid lining platform 32 fixed to the web 28 as by welding as indicated at 34, and lining material 36 fixed to the platform 32 as by rivets 38 or bolts. As is apparent by comparison of FIGS. 2 and 3, as the lining material 36 wears, the heads of the rivets 38 more closely approach the interior cylindrical surface 40 of the drum 20. To provide an indicator from which the degree of lining wear can be ascertained in a brake of the type illustrated in FIGS. 1 through 4, the present invention provides on the annular portion 42 of the dust shield 22, which is concentric with the interior surface 40 of the drum 20, an indicator plunger 44 extending in a light frictional fit through the central aperture 46 of an elastomeric grommet 48 mounted through and embracing the portion 42 on opposite sides of the through aperture 50 in the portion 42 of the dust shield 22. At its radially outer end, the indicator plunger 42 is formed with an enlarged, preferably convex, head 52, adapted to abut the interior arcuate surface of the platform 32 of the brake shoes 12 or 14 (see also FIG. 1). The stem 54 of the plunger 44 is provided with a plurality of transverse markings or indicia 56, the location of and spacing between the markings 56 being such that one of such markings 56 is aligned with the exterior surface of the grommet 48 when the head 52 is in abutment with the platform 32, the brake is energized and the lining material 36 has had no wear. A second of the markings 56 may be so spaced along the stem 54 that it is aligned with the exposed surface of the grommet 48 when the plunger 44 is pushed radially outwardly to engage its head 52 with the platform 32 of the brake shoe 12 while the brake is energized and the lining material 36 is worn to the extent of one-half of its total available wear. A third indicia 56 is provided on the stem 54 and so spaced therealong that it is aligned with the exposed surface of the grommet 48, as shown in FIG. 3, when the plunger 44 is displaced radially outwardly, as indicated in FIG. 3, to engage its head 52 with the interior surface of the platform 32 while the brake is energized when the aligning material 36 is worn to the full degree which it should be worn and should be replaced.

The indicia 56 on the stem 54 of the plunger 44 are preferably indentations which can be sensed by touch and which will not inhibit movement of the plunger 44 through grommet 48, and should be sufficiently large that they are readily visible at a distance such as at arms length.

As is apparent, the lining wear indicator of the present invention can be manipulated to provide an indication of the degree of lining wear which can be sensed from the exterior of the entire brake mechanism. It is not necessary to remove the brake drum 20. It is not necessary for the service personnel to attempt to peer into the interior of the chamber defined within the brake drum 20, and it is not necessary to provide any large aperture in the dust shield 22 to permit entry of light into the interior in an effort to make an otherwise obscured lining wear indicator visible. The integrity and effectiveness of the dust shield is thus maintained, with the lining wear indicator of the present invention.

SECOND EMBODIMENT

Figure 5:
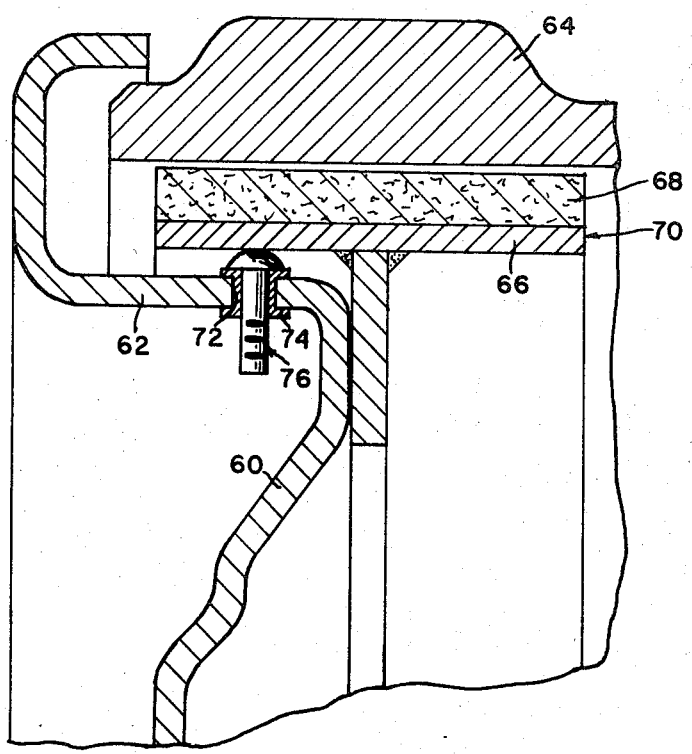
FIG. 5 is a fragmentary view similar to FIG. 2 illustrating the application of the present invention to a backing plate equipped brake mechanism.

FIG. 5 illustrates the applicability of the present invention to brake mechanisms similar to that shown in FIGS. 1 and 2 but provided with a backing plate 60 secured to the axle by conventional means rather than a spider and dust shield as in the first embodiment. In the backing plate embodiment illustrated in FIG. 5, the backing plate 60 has a cylindrical portion 62 disposed within the brake drum 64 in radially opposed relation to the arcuate platform 66 for the lining 68 of the brakes shoe 70. The portion 62 of the backing plate 60 is formed with a through radially extending aperture 72 in which is received a grommet 74 of the same form as described in detail in reference to the embodiment of FIGS. 1 through 4 and in which is frictionally received a plunger 76 of substantially the same form as that of the plunger 44 of the preceding embodiment. The plunger 76 may be moved radially outwardly through the grommet 74 to engage its head with the interior surface of the platform 66 in the various suggested positions of the shoe 70 to provide a visual and manually sensible indication of the degree of lining wear.

I claim:

1. In an expansible brake assembly including a stationary brake shoe support, a brake drum having a cylindrical inner surface rotatable relative to said support, a plurality of lined brake shoes radially movably mounted on said support within said brake drum, the positions of said shoes varying with the degree of wear of the linings thereon, actuator means for moving said shoes between retracted deenergized positions and expanded energized positions in engagement with said drum; lining wear indicating means comprising:

a stationary member having a cylindrical wall portion substantially concentric with the cylindrical inner surface of said drum portioned radially inwardly of and in at least partial axial alignment with said brake shoes, said cylindrical wall portion having an exposed inner surface;

a movable member mounted on said cylindrical wall portion for radial movement relative thereto between a first limit position of travel determined by said cylindrical wall portion and a second limit position of travel determined by abutment of a portion of said movable member with a portion of an associated one of said shoes;

said movable member having a travel indicator extending inwardly of the exposed inner surface of said cylindrical wall portion to provide an indication of the radial position of said movable member; and whereby said travel indicator provides an indication of the degree of wear of the lining of said associated shoe when said brake is energized and said movable member is simultaneously in said second limit position.

2. Brake lining wear indicating means as defined by claim 1 wherein said stationary member is a dust shield secured to said support, said dust shield having further a radially outwardly extending portion extending beside said brake shoes and substantially enclosing the open end of said drum.

3. Brake lining wear indicating means as defined by claim 1 wherein said stationary member is an integral portion of said support.

4. Brake lining wear indicating means as defined by claim 1 wherein said movable member comprises an axially elongated plunger extending through an aperture in said cylindrical wall portion, wherein a grommet is provided in the aperture in close surrounding relation to the stem of the plunger and wherein the plunger has a head of larger cross section than the cross section of the aperture through the grommet, the head being disposed between the grommet and the adjacent portion of the associated brake shoe, the stem of said plunger extending through the aperture in the grommet and having a plurality of indicia axially spaced thereon whereby, upon movement of said plunger through said grommet to a position in which its head engages said brake shoe while said brake is energized, the indicia remaining on the side of said grommet opposite said brake shoe provide an indication of the position of the brake shoe and thereby an indication of the degree of wear of the brake shoe lining.

5. Brake lining wear indicating means as defined by claim 1 wherein said travel indicator is calibrated to indicate the degree of lining wear while said brake is energized.

6. Brake lining wear indicating means as defined by claim 5 wherein the calibrations comprise a plurality of notches extending transversely of the stem and spaced axially thereof.

PO-1050
(5/69)

UNITED STATES PATENT OFFICE
CERTIFICATE OF CORRECTION

Patent No. 3,533,491     Dated October 13, 1970

Inventor(s) ROBERT R. SVENSON

It is certified that error appears in the above-identified patent and that said Letters Patent are hereby corrected as shown below:

Column 1, line 52, before "actuatable" insert -- having a manually --.

Signed and sealed this 30th day of March 1971.

(SEAL)
Attest:

EDWARD M. FLETCHER, JR.          WILLIAM E. SCHUYLER, JR.
Attesting Officer                Commissioner of Patents